(12) United States Patent
Fuller

(10) Patent No.: US 6,384,903 B1
(45) Date of Patent: May 7, 2002

(54) RANGE GATED REMOTE MEASUREMENT UTILIZING TWO-PHOTON ABSORPTION

(75) Inventor: Harrison W. Fuller, Lexington, MA (US)

(73) Assignee: BAE Systems Information and Electronic Systems Integration, Inc., Nashua, NH (US)

( * ) Notice: Subject to any disclaimer, the term of this patent is extended or adjusted under 35 U.S.C. 154(b) by 0 days.

(21) Appl. No.: 05/773,636

(22) Filed: Feb. 28, 1977

(51) Int. Cl.[7] ............................. G01C 3/08; G01J 3/44; G01N 21/00
(52) U.S. Cl. ..................... 356/4.01; 356/5.01; 356/5.1; 356/301; 356/342; 356/438
(58) Field of Search ......................... 324/0.5 E, 0.5 F, 324/43 L; 356/114, 119, 5, 103, 201, 4.01, 5.01, 5.1, 438, 301, 342

(56) References Cited

U.S. PATENT DOCUMENTS

| | | | |
|---|---|---|---|
| 3,510,225 A | * 5/1970 | Collis | 356/103 |
| 3,519,354 A | * 7/1970 | Brown, Jr. et al. | 356/103 |
| 3,743,419 A | * 7/1973 | Skagerlund | 356/5 |
| 3,768,908 A | * 10/1973 | Zaromb | 356/103 |
| 3,781,552 A | * 12/1973 | Kadrmas | 356/103 |
| 3,782,824 A | * 1/1974 | Stoliar | 356/103 |
| 3,788,742 A | * 1/1974 | Garbuny | 356/103 |
| 3,863,144 A | * 1/1975 | Simpson et al. | 324/0.5 F |

OTHER PUBLICATIONS

C. Wieman et al. Physical Review Letters; vol. 36; No. 20; May 17, 1976.*

* cited by examiner

Primary Examiner—Stephen C. Buczinski
(74) Attorney, Agent, or Firm—David W. Gomes; Daniel J. Long

(57) ABSTRACT

Two-photon absorption measurements are made at various points remote from monitoring apparatus by apparatus which includes two lasers that produce counter-propagating beams through the earth's atmosphere. The lasers are tuned such that the sum of the energies of the photons in each of the laser beams equals that associated with a predetermined transition of a gas in the earth's atmosphere. In one embodiment, a pulsed laser and a CW laser are used. The pulse from the pulsed laser propagates along the CW beam produced by the CW laser and overlaps the CW beam at positions determined by a range gating technique, which makes possible the measurement of the two photon absorption at the various positions of overlap or coincidence. In one embodiment, the subject apparatus is utilized for pollution monitoring, in which the frequencies of the lasers are tuned such that the energies of the photons from these lasers add up to a transition of a predetermined pollutant.

30 Claims, 4 Drawing Sheets

RANGE GATED REMOTE MEASUREMENT UTILIZING TWO-PHOTON ABSORPTION

FIELD OF THE INVENTION

This invention relates to remote monitoring and more particularly to a method and apparatus for establishing the value of a monitored condition at points remote from the monitoring apparatus through the use of two-photon absorption and a range gating technique.

BACKGROUND OF THE INVENTION

Two photon absorption has been used in the past in spectroscopy expirements to measure the spectra of a gas in a gas cell. This technique, to be described later, measures absorption characteristics of a gas at only one point, at the gas cell. Thus, two-photon absorption has not been available as a tool to measure absorption at remote locations. In fact, the monitoring of atomic or molecular absorption at locations remote from monitoring apparatus has always been difficult and has usually necessitated apparatus at the point of measurement.

However, with the development of range-gated optical radars, the range of an object, even a volume of atoms or molecules, may be determined. Several investigators have used pulses of light and range-gating techniques to stimulate Raman scattering along the path of the pulse projected by an optical radar and to determine the range at which the scattering takes place. This technique involves "single photon" absorption as opposed to "two-photon" absorption, the significance of which will become clear hereinafter. After "single photon" pumping by the pulse, backscattered radiation is detected along with the time of arrival of the backscattered radiation to obtain an indication of the amount and location of the absorption. The system described has been given the acronym LIDAR (light detection and ranging) and is referred to herein by that name. This work has been exceptionally useful in the area of pollution monitoring due to its range determining capability.

It will, of course, be appreciated that monitoring of the existence or amount of a predetermined pollutant at some distance from the monitoring apparatus provides the basis for detailed pollution concentration maps and therefore provides an accurate basis for pollution control.

While the LIDAR system does, in fact, provide for range-gating, its performance is dependent upon backscattered radiation, a substantial part of which falls off as the inverse square of the distance, $(1/r^2)$. Not only is this type system somewhat inefficient and insensitive at large ranges, but also, the measurement of the intensity of the backscattered radiation is highly dependent upon the distance of the pulse from the monitoring apparatus. This is because, as the pulse propagates away from the monitoring apparatus, the measurement must be corrected for the expected $1/r^2$ decreasing intensity. While the decreased intensity is theoretically calculatable, in practice, it is difficult to get a normalized reading of the backscattered energy over large ranges or distances, even if it is detectable.

Prior to LIDAR, pollution monitors have, in general, measured the total amount of a particular pollutant in a column of gas, in which the column either extends vertically all the way through the earth's atmosphere or in which the column extends horizontally from one monitoring point to another. In these systems it is impossible to differentiate between pollutant concentrations at any given location in the column, but rather it is an averaging technique which measures the average amount of pollutant over the entire column.

The subject system, instead of utilizing averaging or Raman-scattering, makes use of two-photon absorption which permits range gating without the $1/r^2$ dependence. In one embodiment, a pulsed laser and a continuous wave (CW) laser are used, both of which produce colliminated beams of energy, with the beam from the pulsed laser being only as long as the pulse. It is the sensing of one of these collimated beams after the two-photon interaction which eliminates the $1/r^2$ dependence typical of Raman scattering because the collimation is not destroyed by the two-photon interaction. The frequencies of the lasers are set such that the energy of the photons of one laser, $hv_1$, plus the energy of the photons of the other laser, $hv_2$, equals, or nearly equals, that of a transition of the particular pollutant to be monitored.

In order to achieve range gating, two lasers are set up such that the beams from the lasers are "counter-propagating" in that one beam is propagating in one direction and the other beam is propagating in the opposite direction along the same axis of propagation as the first beam. In the aforementioned embodiment the intensity of the CW beam is continuously read out and correlated with the position of the pulse as the pulse travels along the CW beam, such that the intensity of the CW beam after the two-photon interaction, when correlated with the position of the pulse, specifies the amount of two-photon absorption at the points of overlap or coincidence. The amount of absorption may then be correlated with the amount of pollutant to give pollutant concentration at various known locations. The fact of any absorption at a known location also gives an indication of the existance of a pollutant and its identity.

In general, it is the counter-propagation, the varying points of overlap of energy $hv_1$ and $hv_2$, and the monitoring of one of the collimated beams after the absorption which provides for the relative independence of the measurements on range.

Rather than utilizing pulsed and CW lasers, two continuously operating lasers may be used in which their beams cross in an "X". The point of overlap at the crossing may then be moved in a scissor-like action to vary the point at which the measurement is made. Alternatively, two counter-propagating CW beams may be used in which the frequency of one of the beams is periodically swept such that $hv_1+hv_2$ add up to the desired transition of a gas at different points. The different points may be selected by periodically altering the rate of the sweep or by starting a constant rate sweep at different times.

The range-gating is made possible because of the "two-photon" absorption. It has been found that when a photon of one energy and a photon of another energy add up to the energy associated with a predetermined transition of a gas through which the photons travel, the gas absorbs the energy of both photons regardless of the relative energies of the individual photons, thereby removing these photons from the particular beams. In the subject invention, it will be appreciated that the requisite energies, $hv_1$ and $hv_2$, only exist at the point of overlap of the beams. Thus, absorption only takes place at the point of overlap or coincidence and since this point of overlap is moved along the direction of propagation of one of the beams, it is possible to measure the amount of absorption with position or in one embodiment as against the range of a pulse.

In one embodiment, the pulsed and CW lasers are spaced apart at two stations and pointed at each other through the earth's atmosphere. In another embodiment, the two lasers, one pulsed and one CW, are located on the same platform.

This is called the "single-sided" embodiment. Spaced from the platform are a number of corner reflecting or retroflective devices which reflect the energy transmitted from the lasers on the platform back along the original path to the platform. In this embodiment the pulsed laser is turned on first to emit a pulse of light and immediately thereafter the CW laser is turned on. The pulse travels the distance from the platform to the corner reflector and is then returned to the platform along the same path. Immediately after the pulse is reflected by the corner reflector it starts to overlap the outgoing CW beam. This establishes counter-propagating beams or more particularly a pulse which counter-propagates with respect to the CW beam. The pulse travels back along the CW beam and at the points of overlap various amounts of absorption occur, with the amount of absorption depending upon the amount of pollutant at the point of overlap. The information as to the amount of absorption is carried on the CW beam which is reflected by the corner reflector and is returned to the platform where an intensity measurement is made. The intensity or other two-photon absorption related characteristic of the CW beam is monitored at the platform and is correlated with the range of the pulse from, in this case, the corner reflector. It will be noted that the beam intensity measurement is made after the two-photon interaction in terms of the number of photons removed from the beam during the interaction.

While the subject invention is useful in monitoring the existance and extent of pollutants in the earth's atmosphere, it will be appreciated that the subject system may be utilized to localize and detect two-photon absorption associated with any absorbing species occurring at a given position in the earth's atmosphere. As will be described, two-photon absorption may also result in stimulated emission which is collimated within and carried by one of the beams. The stimulated emission resulting from the two-photon absorption may thus be detected at the monitoring station with the arrival of the "carrier" beam and correlated as to its position.

It is therefore an object of this invention to provide improved remote measurements utilizing two-photon absorption.

It is another object of this invention to provide improved pollution monitoring apparatus for measuring the existance and/or concentration of various pollutants in the earth's atmosphere at selectable remote locations.

It is a further object of this invention to provide range gated absorption measurements through the use of two-photon absorption and coherent beams which overlap at selectable points along a path.

It is yet another object of this invention to provide a range gating system utilizing two-photon absorption.

These and other features and objects of this invention will become more apparent by reference to the following description taken in conjunction with the accompanying drawings, in which:

DETAILED DESCRIPTION

Figure 1:
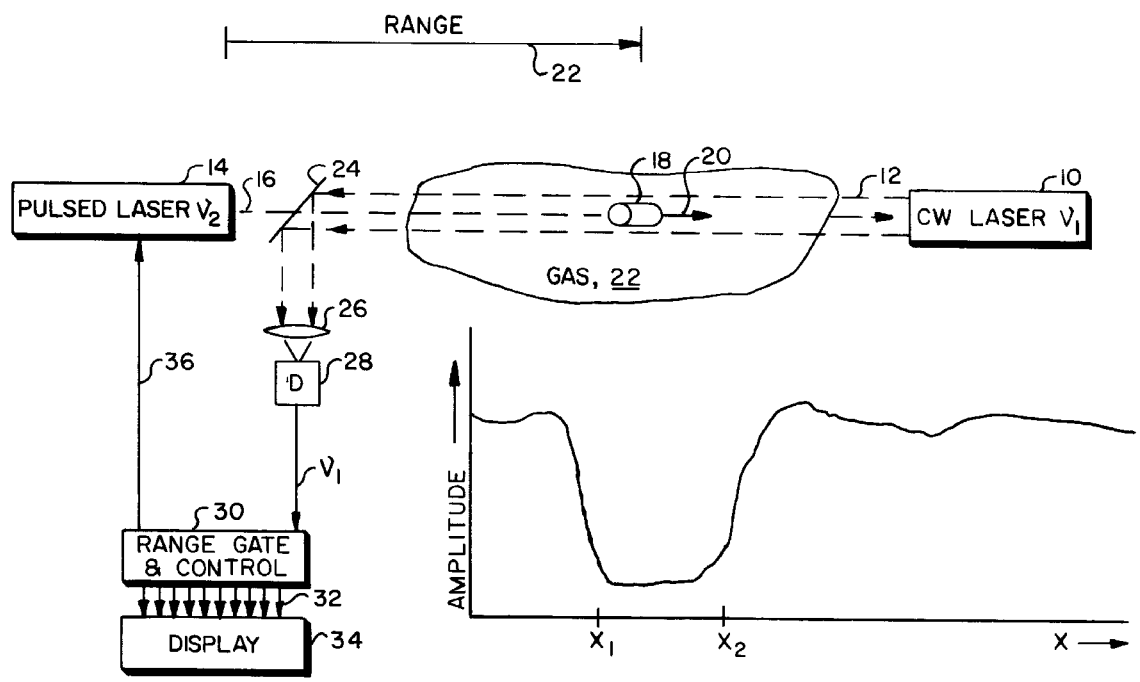
FIG. 1 is a diagrammatic representation of one embodiment of the subject invention showing apparatus for making absorption measurements and an absorption curve in which amplitude is graphed against range.

Two-photon absorption, is a phenomenon which results in spectral line narrowing and thus increased sensitivity when the two-photon process is utilized in detecting the spectral lines of a predetermined gas. As is well known in spectroscopy, if a given atom is pumped with photons of energy exactly equaling that of a predetermined transition, light radiated during fluorescence will have spectral lines centered about predetermined, known frequencies. The spectral lines are, however, indistinct or broadened due to a phenomenon called "doppler broadening". Doppler broadening occurs because of the motion of the individual atoms towards and away from the source which excites them.

The two-photon process eliminates doppler broadening by exciting the gas from two diametrically opposite directions with counterpropogating light beams of approximately the same frequency. This excitation is made possible by the recognition that the energy from a photon coming in from one direction may be added to the energy from a photon coming in from a diametrically opposite direction, such that the sum of energies is exactly equal to the transition desired. Doppler broadening is eliminated because while the particular atom may be moving towards one of the excitation sources at a velocity +v, it will be moving away from the other of the excitations sources by a velocity –v, equal and opposite to the velocity at which it is moving towards the first source. Thus, doppler shifts upwards in frequency as a result of the atom moving towards the first source are cancelled out by an opposite doppler shift as the atom moves away from the second source. When atoms are excited in this manner, the spectral absorption line is considerably narrowed. This makes possible more accurate location of the spectral lines as well as an increase in sensitivity for the entire system.

Previous work in two-photon absorption phenomenon is summarized in Physics Today, July, 1974, pages 17–19 which describes the work of Biraben, Cagnac and Grynberg, Physical Review Letters, Mar. 25, 1974, page 645; Levenson and Bloembergen, Physical Review Letters, Mar. 25, 1974, pages 643–645; and Bloembergen, Levenson and Salour, Physical Review Letters, Apr. 22, 1974, pages 867–869. In these descriptions of the two-photon absorption process, the occurrence of the phenomenon is indirectly measured by detecting the spectral emission of the fluorescing gas in the absorption cell from a position removed from the two laser beams.

More recently, P. F. Liao and G. C. Bjorklund have reported polarization rotation induced by resonant two-photon dispersion in volume 36, number 11 of Physical Review Letters Mar. 15, 1976. In this article, a polarization rotation effect is demonstrated for two laser beams which propagate in the same direction. It will be appreciated that in this reference, it is impossible to obtain a range-gated measurement because it is impossible to distinguish absorption which occurs at different positions along the paths of the lasers. As mentioned hereinbefore, it is the property of the counter-propagating laser beam system, to be discussed hereinafter, which permits range-gated measurements or, more particularly, the measurement of absorption at selectable positions along the paths of the laser beams.

Range Gating with Two-Photon Absorption

With this understanding, referring to FIG. 1, it will be seen that not only is it possible to get improved absorption definition from the use of the two-photon phenomenon, but also when two counterpropagating beams are utilized, it is possible to select at which section along the path of the beams a particular measurement is made. It is the ability to select various sections along the propagating path of the beam that permits for a determination of not only the level of two-photon absorption but also the range of the two-photon absorption.

In the embodiment of FIG. 1 a CW laser 10 set to a frequency, $v_1$, generates a beam 12 in the direction of a pulsed laser 14 set to a frequency, $v_2$. The output of the pulsed laser is directed along a line 16 which is co-axial with beam 12 such that a pulse of light 18 propagates in the direction shown by arrow 20. The range of the pulse is given by arrow 22 to be measured relative to the location of the pulsed laser. As will be described later, the sources 10 and 14 may be any type which produce a collimated, monochromatic beam of energy. When these sources are aimed at each other through a gas 22, any absorption of photons from either of the two beams that takes place, takes place only at the position of overlap of pulse 18 with beam 12. During the absorption process, photons are removed from each of the beams with the numbers of photons being proportional to the concentration of the particular element or molecule which absorbs the photons. In this embodiment, an absorption dependent parameter or characteristic of beam 12 is measured at the location of the pulsed laser. For this purpose, a color selective mirror 24 reflective at $v_1$, or any other suitable device, such as a half-silvered mirror, is interposed in path 16 which redirects beam 12 through focusing optics 26 to a detector 28. Detector 28 detects the intensity of beam 12 after the two-photon interaction, and may be any one of a number of conventional photo diodes or photo detectors. The output of the detector is coupled to a conventional range gate and control unit 30 such as is used with conventional laser range finders. A number of output lines 32 are provided from the range gate and control unit 30, with a signal on each line representing the existance of the detected signal at a predetermined range. Each line designates a range "bin" in which data at some range ± a given accuracy is collected. The measured value in a range bin corresponds to the range "bin" value. These lines are coupled to a conventional display 34 which displays output as a function of range, or more particularly displays the values of the range "bins".

As will be appreciated, range gate and control unit 30 is also responsible for the activation of pulsed laser 14 and accomplishes this by generating an actuation signal over a line 36. The production of the activation signal provides a time base from which to measure the range of pulse 18 as it propagates along beam 12. The range gate and control unit 30 is similar to that used in many optical radars and basically correlates the detected energy with the range of the outgoing pulse from the laser.

Assuming that either the existance or concentration of a given pollutant such as carbon monoxide is to be monitored, then the frequencies of lasers 10 and 14 are set such that $v_1+v_2$ correspond to a desired transition of the carbon monoxide molecule. The output of detector 28 when graphed against range (see graph of FIG. 1) may indicate that between ranges $x_1$ and $x_2$ there is a large concentration of carbon monoxide. This may correspond, for instance, to the counter-propagating beams passing over a highway in which there is a good deal of automobile traffic.

Figure 2:
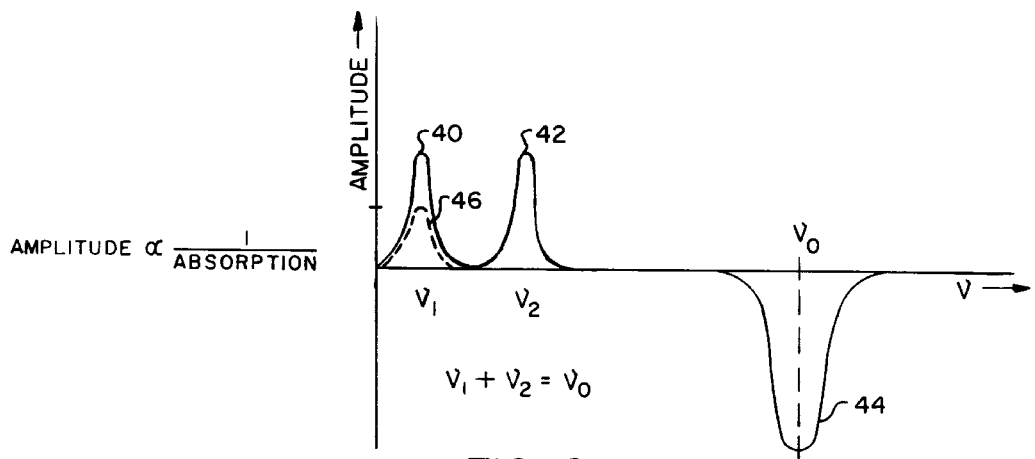
FIG. 2 is a graph of amplitude versus frequency for the outputs of the lasers of FIG. 1, the strength of the absorption and the strength of one of the beams after absorption.

In order to explain the phenomenon which results in the production of such a graph, and referring to FIG. 2, the outputs of the two lasers are graphed against frequency. The output of laser 10 is illustrated by reference character 40 and the output of laser 14 is illustrated by reference character 42. It will be appreciated that $v_1+v_2=v_0$ which is the absorption line illustrated at 44, for a given atom or molecule of interest. The intensity of the $v_1$ beam which is detected at the location of the pulsed laser is illustrated by dotted line 46. It will be appreciated that the amplitude of this line is inversely proportional to the pollutant concentration, since two-photon absorption is directly proportional to the concentration of the atoms or molecules present in the path of the beams. Moreover, if there is any significant diminution in the amplitude of the CW beam, it denotes the presence of a particular pollutant. It will be appreciated that the subject system utilizes two opposing or counter-propagating coherent beams with the interaction occurring during the overlap of the beam so that the energy of photons $E=hv_1$ in one beam added with the energy of photons $E=hv_2$ in the other beam equals an energy which is absorbed by atoms at a discrete energy state or transition $h(v_1+v_2)=hv_0$. Note: h is Plank's constant and v refers to the frequency of the coherent source of radiation, with $hv_0$ denoting the energy of the desired transition. It should be noted that while atoms have fairly well defined allowed transitions, molecules in addition to having defined transitions, also have quantized rotational momentum states to which the two lasers may be tuned. Thus, it is possible to utilize microwave radiation as well as laser radiation in stimulating two-photon absorption. If, as in the illustrated embodiment, one of the lasers is pulsed and the other operated in the CW mode, then by simple range gating techniques the amount of absorption at a number of successive sectors along the path of the pulse beam can be measured. The sector that is measured is at the location of the overlap between the pulse and the continuous counter-propagating beam as the pulse propagates along the CW beam.

Other range gating techniques include frequency swept laser beams in which $hv_1$ and $hv_2$ add up to the desired transition only once during the sweep cycle and thus only once at a given position between the two lasers. By starting the laser or lasers at different times successive regions along the path between the two lasers can be selected, with the region depending on the location between the two lasers at which $hv_1$ and $hv_2$ add up to the desired transition. This can be accomplished with either counter-sweeping lasers, or with one laser always at one frequency and the other laser sweeping the frequency of its output either at different sweep rates or at different times.

Figure 3:
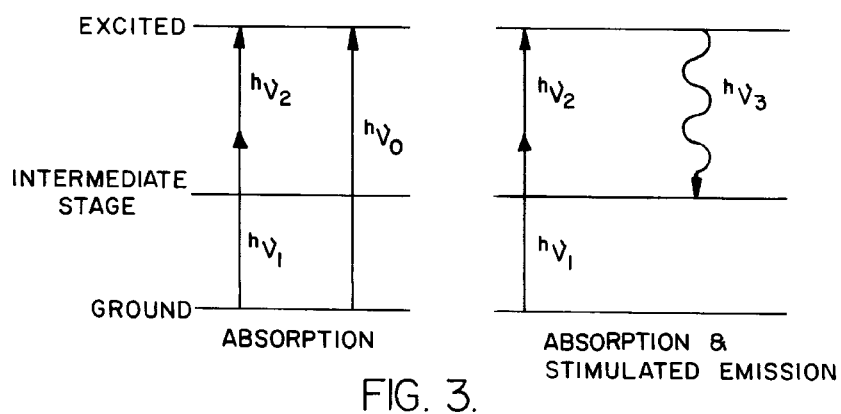
FIG. 3 is an energy level diagram for two-photon absorption and two-photon absorption plus stimulated emission.

In the above example, the absorption takes place at $hv_0$ as illustrated diagrammatically in the righthand portion of the energy level diagram of FIG. 3.

Various absorption lines are now listed for various pollutants of current interest:

TABLE I

| | |
|---|---|
| Nitrous Oxide | 2224 cm$^{-1}$; 2560 cm$^{-1}$; 1880 cm$^{-1}$ |
| Nitrix Oxide | 1876 cm$^{-1}$ |
| Nitrogen Dioxide | 1617 cm$^{-1}$; 2306 cm$^{-1}$; 1617 cm$^{-1}$; 2906 cm$^{-1}$ |
| Water Vapor | 10–30 cm$^{-1}$; 1594.73 cm$^{-1}$ |
| Carbon Monoxide | 2143 cm$^{-1}$ |
| Carbon Dioxide | 1932.5 cm$^{-1}$ |
| Methane | 3018 cm$^{-1}$; 1300 cm$^{-1}$; |
| H$_2$ | CO 2800 cm$^{-1}$ |
| HCL | 2886 cm$^{-1}$ |

The photon energies may vary just as long as they add up to the desired transition, and as long as the resulting two-photon absorption is sufficiently strong for detection. It is even possible to combine radiation in the visible spectrum with radiation in the microwave region. It is also possible to utilize more than two photons whose energies add up to the desired transition.

In order to improve the absorption cross section of the gas it is desirable to choose one photon to be near an intermediate transition of the gas utilized. By doing this the absorption cross section for the desired two-photon transition can be increased by as much as 10$^7$.

The line narrowing due to the doppler cancellation in the two-photon process also simultaneously increases the absorption cross section which contributes to the applicability of this process to a wide variety of gases.

When using two laser beams of power $P_1$ and $P_2$, respectively, the absorption cross section in one beam can additionally be enhanced by increasing the power in one beam, in the other beam, or in both beams. In one operative embodiment for a maximum range of 10 miles, adequate absorption cross sections for a wide range of elements can be achieved with a 10 watt peak pulse dye laser which produces a pulse of 0.25 microseconds=250 nanoseconds and a 100 milli watt CW laser.

Stimulated Emission

As mentioned hereinbefore, two-photon absorption can be measured by measuring the intensity of the stimulated emission. Stimulated emission is much different than the measurement of fluorescence as described in the prior art. Stimulated emission is both coherent and collimated along the path of the collimated counter-propagating laser beams. Fluorescence occurs omni-directionally and its intensity falls off heavily as the square of the distance. In stimulated emission, the intensity along the collimated path falls off in the same manner as a collimated laser beam. The collimation arises because the emitting atom is located within the standing waves of the laser beams, and the emission is collimated within the beams. Thus, when the emission is measured along the axis of the CW beam, it is the stimulated emission which is measured and not fluorescence. It should be noted that fluorescence in the prior art is measured outside of the interacting beam.

Another difference between stimulated emission and fluorescence is that stimulated emission occurs practically instantaneously where there is a finite lifetime and decay for fluorescence.

Figure 4:
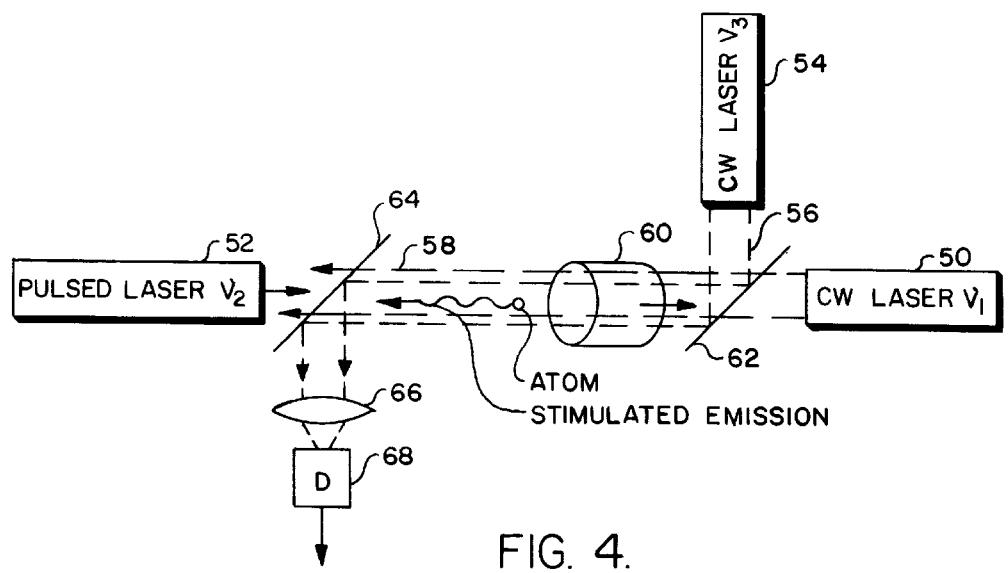
FIG. 4 is a diagrammatic representation of an embodiment utilizing two-photon absorption to generate stimulated emission, the strength of which is measured to give the strength of the absorption, and thereby the concentration of the absorbing species.

Referring to FIG. 4, a situation is illustrated in which it is the stimulated emission which is utilized. In this embodiment, a CW laser 50 at $v_1$ is aimed at a pulsed laser 52 at $v_2$. Additionally, a third laser 54 which has a CW output at a frequency $v_3$ projects a beam 56 which is reflected coaxially with the paths of the beams from lasers 50 and 52. In this case the beam from laser 50 is designated by reference character 58 and the pulse from the pulsed laser is designated by reference character 60. The beam from laser 54 is reflected by a device 62 which reflects energy at this frequency and is reflected again by a similar device 64 through focusing optics 66 to a detector 68. $v_3$ is set to a transition which occurs between an excited and intermediate state as illustrated in FIG. 3.

As illustrated in FIG. 4, one of the atoms of interest is located in the path of the counter-propagating beams. The purpose of the radiation at $v_2$ and $v_1$ is to populate the excited state of the gas via two-photon absorption so that the stimulated emission can take place. In the absence of two-photon pumping there is a negligible number of atoms in the excited electronic states of most atomic species under atmospheric conditions in the lower atmosphere. The coherent emission by the atom at $v_3$ is stimulated by the presence of a CW beam at $v_3$. The stimulated emission which results is coupled with and collimated by the radiation from CW laser 54 so that it propagates substantially in the direction shown. As such, the radiation is confined colinear with beam 58 and therefore is not permitted to radiate omnidirectionally as would be the case with spontaneous emission which results in fluorescence.

As in the former cases, $hv_1 + hv_2 = hv_0$. Upon the coupling of the photon energies $hv_1 + hv_2$ into the atom, the excited state is populated. The $hv_3$ photons lead to an almost immediate stimulated emission and it is the strength of this stimulated emission which is detected at detector 68. The output of detector 68 may then be coupled to any suitable range gate apparatus for correlating the position of pulse 60 with respect to the pulsed laser.

Alternatively, only two lasers need be utilized, with $v_3$ set to $v_2$, or $v_1$. In this case, one of the beams used for two-photon absorption is also used for the stimulation. Also, the detector in this alternative embodiment is set to respond to whatever $v_3$ transition exists, there being at least a second order coupling of the stimulated emission to the pumping beam for producing the aforementioned collimation.

It will be noted that stimulated emission results in a significantly improved signal to noise ratio, if a transition which is strongly allowed can be found for $hv_3$. In such a case, a relatively weak beam can be used to stimulate the decay of the pumped level. Thus, the ratio of stimulated photons to stimulating photons can be maximized.

"Single-Sided" Embodiment

Figure 6:
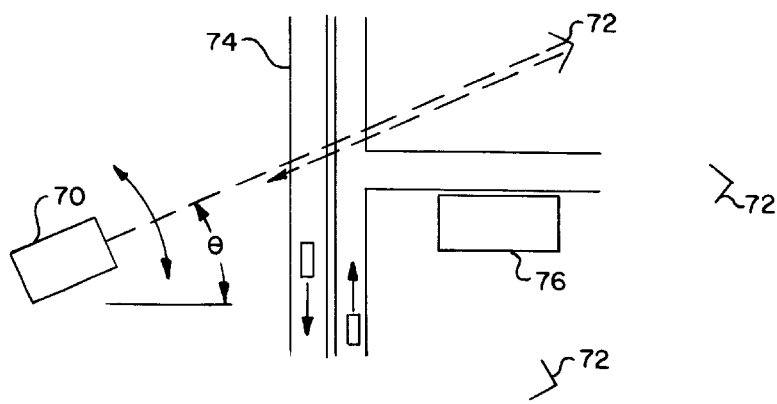
FIG. 6 is a diagrammatic representation of the use of the apparatus of FIG. 5 in one type of environment.
Figure 5:
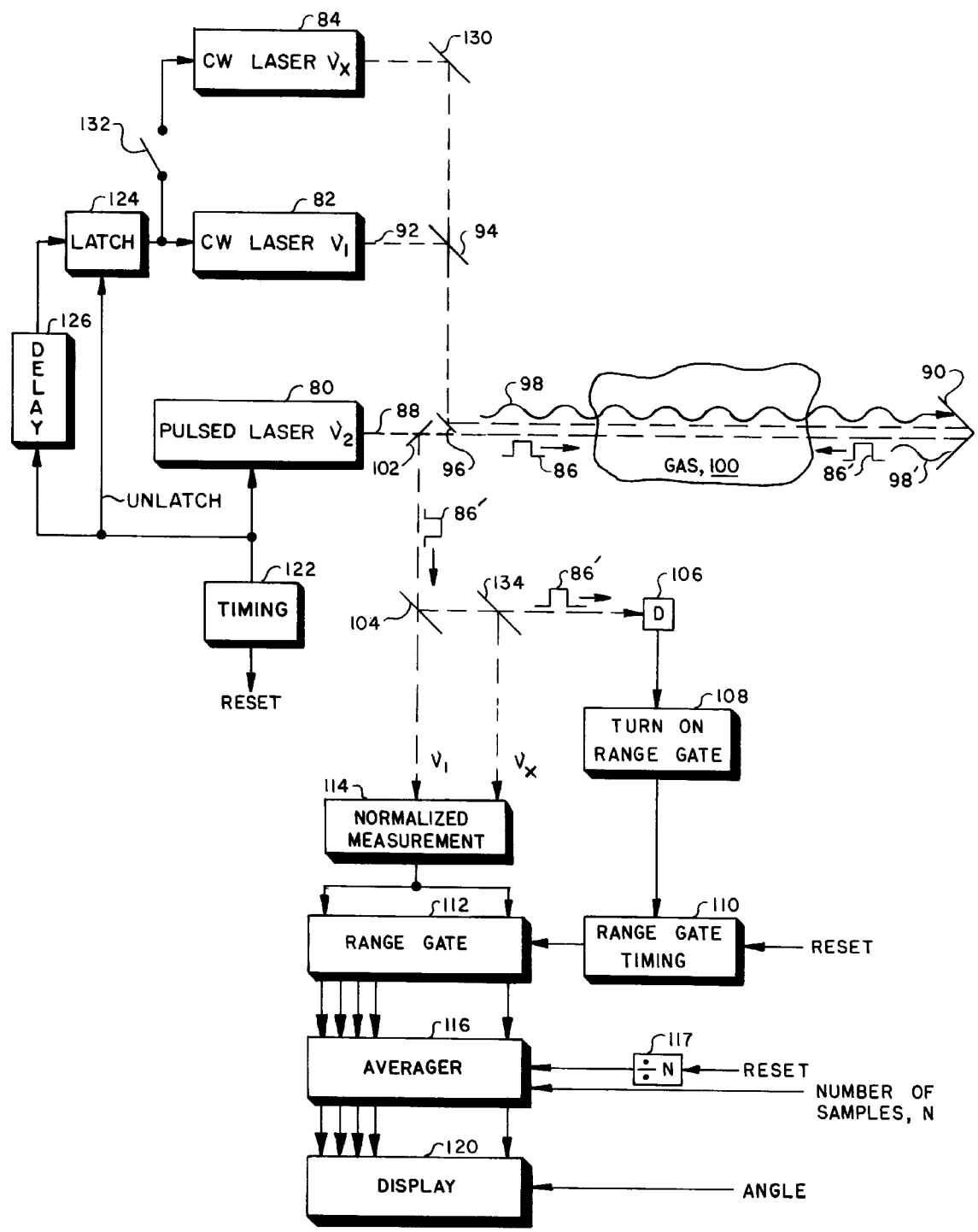
FIG. 5 is a diagrammatic representation of single-sided apparatus for obtaining range gated two-photon absorption measurements.

Referring now to FIG. 5, an embodiment is illustrated in which it is not necessary to provide lasers at two different locations in order to obtain the two-photon absorption measurement. Rather, in this case, all the lasers are located at one platform and light weight corner reflectors or other retroflective devices are located at points remote from the platform such that, as illustrated in FIG. 6, the lasers on the single platform may be aimed at various corner reflectors. In FIG. 6, the apparatus on the platform is generally indicated by reference character 70 and various corner reflectors are illustrated by reference characters 72. As can be seen from this figure, the monitoring apparatus may be mounted on a pivotable support and swept across a scene so that it is aimed at various corner reflectors. The orientation of the corner reflectors is not particularly critical, since within certain limits energy coming in along one direction is redirected back along the same direction regardless of the particular angle from which it arrives. In this manner pollutant concentrations can be monitored at various locations between the platform and the corner reflectors. In the example shown, it is possible, with two-photon range-gating, to measure pollutant concentration at, for instance, a road diagrammatically illustrated at 74 or at an industrial plant such as that illustrated at 76.

Referring back to FIG. 5 in this "single-sided" embodiment, a pulsed laser 80, a CW laser 82 and calibration laser 84 may be located at platform 70 of FIG. 6. The CW laser is set at $v_1$, the pulsed laser is set at $v_2$ and the calibration laser is set at $v_x$, where $v_x$ is a frequency removed from that of any absorption transition of atoms or molecules of the gas to be monitored. The output of the pulsed laser is a pulse 86 which propagates along a direction 88 to a corner reflector 90 and thence back along the same path as illustrated by pulse 86'. Immediately after the production of a pulse 86 from pulsed laser 80, CW laser 82 is activated to produce a CW signal along path 92. The signal from laser 82 is reflected by a half-silvered mirror or other device 94 and again by a similar device 96, such that the signal illustrated at 98 propagates along the same path as that of the pulse.

It will be appreciated that pulse 86 reaches the corner reflector before signal 98 and is reflected such that pulse 86', the reflected pulse, is counter-propagating with respect to outgoing signal 98 to establish counter-propagating beams of energy. It will be appreciated that both pulse 86' and signal 98 propagate through gas 100 and any two-photon absorption occurs because the molecules or atoms in this gas exist at the point of overlap between the returning pulse 86' and the outgoing signal 98.

Upon return of pulse 86' it is reflected by half-silvered mirror or like device 102 and another such device 104 such that its arrival is detected by a detector 106. This, in turn, operates to turn on a range gate via a unit 108 which produces a pulse coincident with the detection of pulse 86'. The pulse from unit 108 is utilized to turn on a range gate timing unit 110 which sequentially clocks a conventional range gate unit 112 at a predetermined rate to sequentially open up all the individual gates of the range gate unit and then stop. Thus, after the range gate has run through a single range gating sequence, it shuts down and the detecting and display circuitry is then in effect turned off until the cycle is repeated. The output of the range gate unit is a plurality of signals, each corresponding to a different range, in which the individual gates of the range gate unit, when opened up, connect the input signal at the unit to a corresponding output terminal. The individual gates of the unit are strobed and opened up in a sequence determined by the timing signals from timing unit 110, such that the time of opening a given gate corresponds to a given range of pulse 86' from reflector 90.

After the reflection of pulse 86', signal 98 is also reflected via corner reflector 90. The reflected signal is labeled 98', and its amplitude is a function of the amount of absorption that has taken place priorly, as pulse 86' propagated counter-propagationwise with respect to unreflected signal 98'. Thus, the 98' signal acts as a record of what has taken place as pulse 86' propagates back towards platform 70. The retroflected signal 98' is reflected by device 102 and is coupled to a normalized measurement unit 114 which produces a signal normalized with respect to the signal from calibration laser 84. This will be described hereinafter.

Assuming for the moment that a normalized signal from unit 114 is applied to range gate unit 112, it will be appreciated that the output signals from range gate unit 112 represent the normalized signal at various positions of the returning pulse 86' as measured from corner reflector 90.

The output of range gate unit 112 is applied to an averaging circuit 116 which averages the return for each range over a number of pulses from laser 80. The average value is then displayed at 120 in which the display portrays intensity with respect to range.

With respect to the control of the lasers, timing unit 122 is provided to turn on the CW laser immediately after the production of a pulse from the pulsed laser. This timing unit produces a timing signal which initiates the production of a pulse of energy from laser 80, while at the same time releasing a latch 124 which inhibits CW laser 82. The timing signal from timing unit 122 is also applied to a delay unit 126 set to delay the timing signal by the length of the pulse from pulsed laser 80. In one operative embodiment, for ranges of 0–10 miles, the pulse from laser 80 is one microsecond (corresponding tom overlap length of 1000 feet) and thus the delay set for delay unit 126 is one microsecond. The delayed timing signal is applied to latch 124 to enable the latch to turn on CW laser 82. CW laser 82 remains ON until the timing signal from timing unit 122 releases latch 124. Timing unit 122 is set such that the interval between timing signals is longer than the round trip excursion time of pulse 86', the timing not being particularly critical.

In one embodiment, timing unit 122 produces a reset signal at the time laser 80 is activated. This may be used to turn off the range gate timing if the timing unit 110 is such that it continuously cycles the range gates. Thus, in any case the range gate unit is inactivated during the round trip travel time of pulse 86, and this eliminates noise during that period.

This reset pulse is also used with averager 116 in divided-down form. For this purpose a conventional divide-by-n circuit 117 is provided, with n establishing the number of pulses from laser 80 and thus the amount of time over which the averager will accumulate and average data. n also establishes the number of samples and, thus, the averager accumulates the input signal at a given range over the time period associated with n and then divides the accumulated result by n to get the average value.

In the operation of averager 116, it will be obvious that the value accumulated at each range may be averaged by virtue of applying a normalized and range correlated analog input signal voltage across a capacitor, which has a known charging characteristic. The average value per sample may be obtained by dividing the accumulated voltage on this capacitor by a voltage representing the number of samples over the desired averaging period. The quotient will then represent the average value over this number of samples. Such an averager is commonplace and need only be provided with a signal representing the desired number of samples over which the average is to take place and a reset signal which resets the averager after the required number of samples has been accumulated.

In general, the detecting and displaying circuitry is in effect inactivated until such time as a transmitted pulse has been returned and detected. At this time the range gates are sequentially actuated and the information carried on the returned CW signal is averaged and read out.

The CW signal from laser 82 being continuously in operation until just prior to the production of a second pulse from laser 80 serves two functions. First, it provides for a counter-propagating beam which is sampled by the returned pulse. Secondly, because photons are absorbed from this beam when it travels in the forward direction, after reflection it carries this information back to its point of origin. Upon return of the CW signal all detecting and display circuitry are, in effect, activated and the information is read out of the signal as a function of range from the corner reflector. What has therefore been provided is "a single-sided" remote absorption analyzer in which all but the retroflectors may be carried at one location. Not only is almost all the apparatus located at one location, but also, beam steering or pointing accuracy may be minimized by the utilization of a relatively large corner reflector or a planar array of small corner reflectors at the remote location. Colinearity of the beams is established, not by virtue of the accurate aiming of two lasers on separate platforms, but rather by virtue of locating the two lasers on a single platform, from which it is relatively easy to establish colinear beams. Only the steering accuracy of the dual beam need be sufficient to assure that counter-propagating components will overlap.

As mentioned before, when measuring the absolute intensity of the returning beam, it may be necessary to calibrate the measurement. In order to calibrate the measurement, calibration laser 84 is turned on with the output thereof being reflected by a mirror 130 and half-silvered mirror 96 such that its output is also colinear with the other beams. This laser may be switched on via a switch 132 as shown. As such, the output of laser 84 is colinear with the output of laser 82. Since laser 84 is tuned to a frequency which will not interfere with the measurement, it may be operated in a CW mode and monitored continuously with the monitoring of the output from laser 82. The output from calibration laser 84 is likewise returned by corner reflector 90 and is reflected via devices 102 and 104 and a further device 134 to the normalized measurement unit 114.

It will be appreciated that the calibration beam will be attenuated, scattered or absorbed in the earth's atmosphere in substantially the same manner as the energy from the other lasers, aside from the selected two-photon effects. Not only will this occur throughout the folded path length of the beams, but also, at the various positions of overlap of pulse 86' with both of these beams. If the $v_x$ signal, $S_x$, as detected at unit 114, is subtracted from the $v_1$ signal, $S_1$, as detected at unit 114, then a normalized measurement may be obtained at each of the range segments monitored. This unit 114 merely operates such that $S_{norm}=_x-S_1$. Should atmospheric attenuation vary from segment to segment, this will be accounted for by the variation in the $v_x$ beam attenuation and when it is subtracted from the $v_1$ beam, a true normalized measurement will be obtained. It will be appreciated that conventional apparatus may be utilized to detect the $v_x$ and $v_1$ beams at unit 114, to generate signals $S_x$ and $S_1$ corresponding to the intensity of the $v_x$ and $v_1$ beams, and to subtract the $S_x$ from the $Sv_1$. Thus, what is measured is the value of the $v_1$ beam minus the value of the $v_x$ beam and this value is normalized for all range segments for all ordinary attenuation mechanisms, leaving the selected two-photon absorption distribution as a range-dependent signal.

Referring now to display 120, it will be appreciated that the output of the averager may be correlated to the position of platform 70 such that angular position may be plotted as well as the two-photon absorption value and its range. Thus, a map of pollutant concentration vs. location can be conveniently made. Since this type display is conventional, especially in optical radars, it is not described in detail.

OTHER TYPES OF TWO-PHOTON MEASUREMENT

What has been described is a system for measuring the amplitude of one of the two beams after the two-photon interaction and normalizing this measurement. It is, however, possible to measure the intensity of the two-photon interaction by resolving one of the beams after interaction into righthand circularly polarized (RHCP) and lefthand circularly polarized (LHCP) components. This may be accomplished by either physically separating out the two components or by utilizing crossed polarizers which are nulled to eliminate one of the components when there is no two-photon interaction. The effect of having done this is to be able to automatically provide for a normalizing reference signal when, for instance, the righthand circularly polarized components are subtracted from the lefthand circularly polarized components. When these two components are separated, they may be electronically subtracted one from the other, or, as will be described, in a cross polarizing embodiment, the subtraction automatically takes place. The first of these embodiments is described in connection with FIG. 7.

Figure 7:
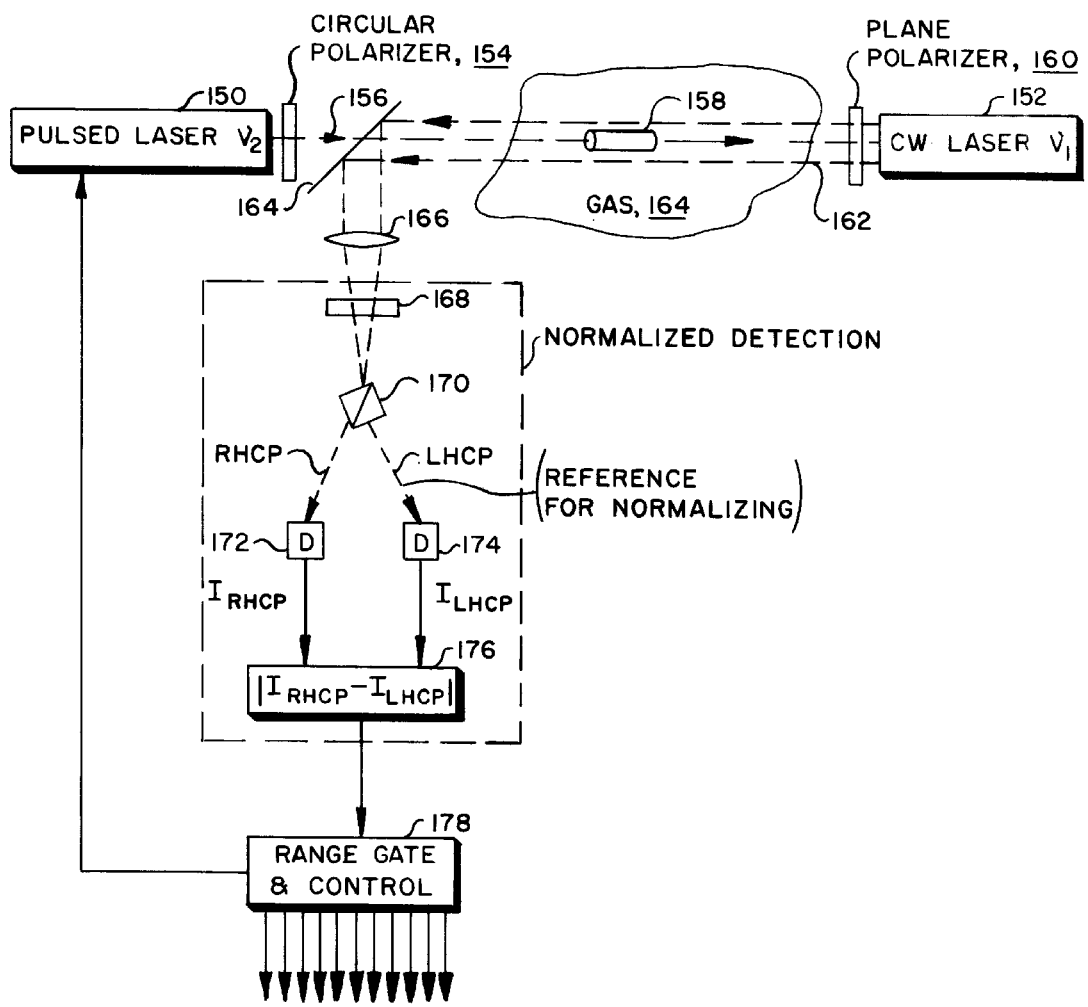
FIG. 7 is a diagrammatic representation of a detection system in which right-hand circularly polarized and left-hand circularly polarized components are resolved.

Referring to FIG. 7, a pulsed laser 150 at $v_2$ is aimed at a CW laser 152 at $v_1$. In this embodiment, a circular polarizer 154 is interposed in the path 156 of a pulse 158 produced by this laser. A plane polarizer 160 is interposed in the path 162 of the CW radiation from laser 152. As before, the paths of these two beams transit a gas 164 which has atoms or molecules having a transition such that $hv_1+hv_2=hv_0$. As before, the beam from the CW laser is reflected by a half-silvered mirror or color selective device 164 through focusing optics 166 and through a quarter wave plate 168. The radiation through plate 168 impinges upon a specialized splitting device 170, which may be a Nicol prism which in combination with the quarter wave plate splits out the righthand circularly polarized and the lefthand circularly polarized components and directs them respectively to detectors 172 and 174. The outputs of these detectors are signals representing the intensity of the split components, $I_{RHCP}$ and $I_{LHCP}$. These signals are supplied to conventional electronic apparatus 176 which obtains $|I_{RHCP}-I_{LHCP}|$. The output of the electronic apparatus is applied to the aforementioned range gating control circuit, here illustrated by reference character 178.

In operation, the signal from the CW laser which has been plane polarized contains equal righthand and lefthand circularly polarized components, whereas, due to the circular polarizer in front of the laser 150, the output of the pulsed laser contains only righthand circularly polarized components. When these components interact in the two-photon process at the point of overlap between pulse 158 and beam 162, the righthand circularly polarized components of the CW beam and the righthand circularly polarized components of the pulse are those which contribute to the two-photon interaction. The lefthand circularly polarized components do not contribute to the two-photon interaction and are therefore not absorbed in the two-photon interaction.

When the righthand circularly polarized and lefthand circularly polarized components are split out it will be appreciated that the lefthand circularly polarized component intensity serves as a reference signal for normalizing the measurement, since these components did not participate in the two-photon absorption. On the other hand, the righthand circularly polarized components of the CW beam are absorbed in accordance with the concentration of the particular element in the gas to which the two lasers are tuned. The result of the subsequent subtraction is therefore the desired absorption measurement.

Figure 8:
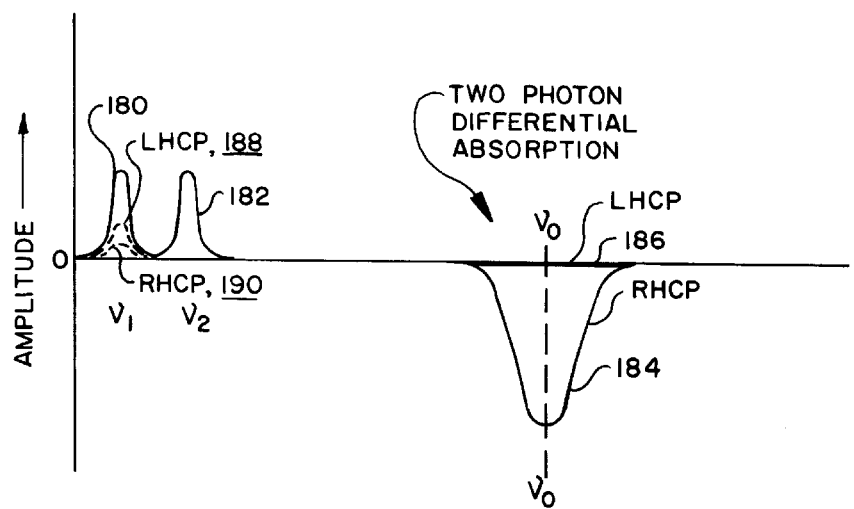
FIG. 8 is an illustration in the form of a graph which illustrates the operation of the detection system of FIG. 7.

This is more fully described in connection with FIG. 8, in which the output from the CW laser is illustrated by reference character 180 and the output of the pulsed laser is illustrated by reference character 182. As illustrated by the graph in FIG. 8, only the righthand circularly polarized components contribute to the two-photon absorption curve 184 which is centered around $v_0$. The lefthand circularly polarized components are not absorbed. To demonstrate this lack of absorption, a heavy line 186 for the LHCP components is illustrated in this graph. The result of this differential absorption is illustrated in that the lefthand circularly polarized component intensity, as illustrated at 190, is greater than the righthand circularly polarized intensity detected as illustrated at 188. This takes place because LHCP component intensity is diminished only by scattering, while the RHCP component intensity is diminished both by scattering and two-photon absorption.

Figure 9:
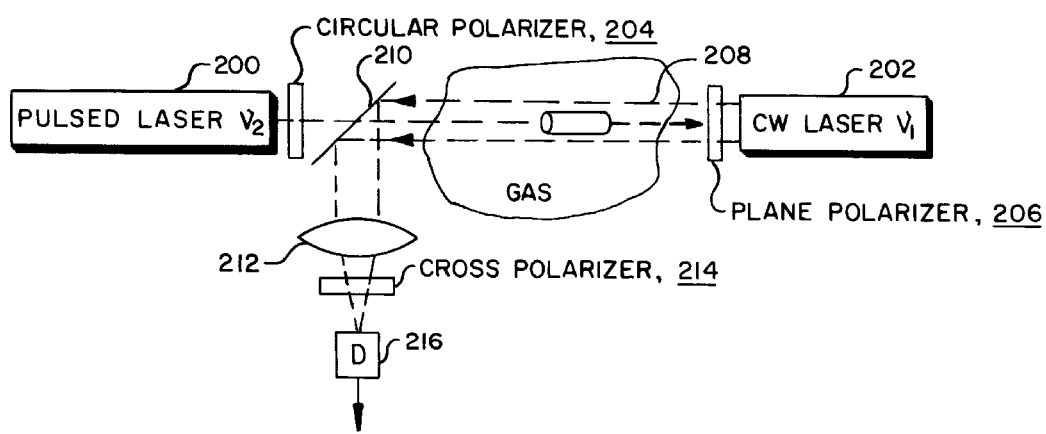
FIG. 9 is a schematic and block diagram illustrating a crossed polarizer detection system.

Referring now to FIG. 9, an alternative embodiment to that of FIG. 7 is shown in which the difference between righthand circularly polarized and lefthand circularly polarized components is measured directly by use of a cross polarizing element. In this embodiment a pulsed laser 200 at frequency $v_2$ is aimed at a CW laser 202 which is likewise aimed back at the pulsed laser. In this embodiment a circularly polarized filter 204 is placed in front of the pulsed laser, whereas a plain polarized filter 206 is placed in front of the CW laser. As in the prior embodiments, the CW beam, here 208, is reflected by a half-silvered mirror or color selective reflecting device 210 through optics 212. The beam from the optics is passed through a plain polarizer 214 which is cross-polarized with respect to polarizer 206, and the light through polarizer 214 is detected by a conventional detector 216.

Because of the cross polarization, the light impinging on detector 216 is, in effect, $|I_{RHCP} - I_{LHCP}|$ and functions similarly to the apparatus described in connection with FIG. 7. Thus, the apparatus of FIG. 9 provides a convenient, simplified detection system for detecting the difference in intensity between righthand circularly polarized and lefthand circularly polarized components. It also provides a convenient measurement of the rotation of the plane of polarization of the $v_1$ beam due to two-photon interaction with the gas in cases where such rotation enhances the two-photon signal detectability at detector 216.

It will also be appreciated that the type of coherent source may vary. In some instances, conventional lasers may be utilized, while in other instances, mode-locked lasers may be utilized to increase the effective absorption cross section of the gas.

Although a specific embodiment to the invention has been described in considerable detail for illustrative purposes, many modifications will occur to those skilled in the art. It is therefore desired that the protection afforded by Letters Patent be limited only by the true scope of the appended claims.

What is claimed is:

1. Apparatus for making remote atomic absorption measurements comprising:
   means, including two collimated counter-propagating beams of coherent energy, for establishing two-photon absorption in the earth's atmosphere at a number of selectable locations along the direction of said beams, and,
   means for measuring a two-photon absorption related characteristic of one of said beams after said one beam has participated in establishing two-photon absorption at a selected location.

2. The apparatus of claim 1 wherein said measuring means includes means for correlating the measured absorption related characteristic with the particular location selected.

3. The apparatus of claim 2 wherein said correlating means includes means for measuring the range of the two-photon absorption at a selected location.

4. The apparatus of claim 1 wherein one of said beams is pulsed and the other of said beams is CW, said means for establishing two-photon absorption including means for sending out said pulse along said CW beam, with the points of coincidence and overlap of said pulse and CW beam defining the selected location of the two-photon absorption, said measuring means including means for detecting said absorption related characteristic as a function of the location of said pulse.

5. The apparatus of claim 4 wherein said detecting means includes means for determining the range of said pulse by establishing the time that said pulse is at a predetermined location and the times that said absorption related characteristic is measured at a location of known position relative to said predetermined location.

6. The apparatus of claim 1 wherein each of said beams is produced by a source of coherent radiation, said sources being spaced apart and aimed at each other to produce said counter-propagating beams.

7. The apparatus of claim 1 wherein each of said beams is produced by a source of coherent radiation, said sources being located at one location and further including retroflective means at a second location spaced from said one location, said sources being aimed at said retroflective means.

8. The apparatus of claim 7 wherein one of said sources is a pulsed source and the other of said sources is a CW source, said means for establishing said two-photon absorption further including means for actuating said pulsed source prior to actuating said CW source, with the points of coincidence and overlap of said outgoing CW beam and the retroflected pulse defining the location of the two-photon absorption.

9. The apparatus of claim 8 wherein said measuring means includes means for detecting said absorption-related characteristic as a function of the location of said pulse.

10. The apparatus of claim 9 wherein said detecting means measures the location of said pulse as a function of its range from said retroflecting means.

11. The apparatus of claim 9 wherein said detecting means includes means for establishing the time said pulse is at a predetermined location and times that said absorption related characteristic is measured at a location of known position relative to said predetermined location.

12. The apparatus of claim 1 wherein said means for establishing two-photon absorption includes two sources of coherent electromagnetic energy, the photon energies of which add up to that associated with a transition of a predetermined gas, and means for varying the location at which said energies add up to that of said transition.

13. The apparatus of claim 12 and further including means for establishing a third beam of electromagnetic energy colinear with said counter-propagating beams, said third beam being of a frequency and a corresponding photon energy which does not interfere with the measurement of said two-photon absorption-related characteristic, and means for normalizing the measurement of the two-photon absorption-related characteristic with respect to a characteristic of said third beam.

14. The apparatus of claim 13 wherein the two-photon absorption is measured by the intensity of said one beam after the two-photon interaction and wherein said normalizing means includes means for subtracting the measured intensity of said one beam from that of said third beam.

15. The apparatus of claim 1 wherein said one beam is linearly polarized and wherein said measuring means includes linear polarizer means cross polarized with respect to the direction of linear polarization of said one beam, means for directing said one beam through said linear polarizer means after it has participated in establishing the two-photon absorption, and means for detecting the intensity of said one beam after it has passed through said linear polarizer means.

16. The apparatus of claim 1 wherein the other of said beams is in the form of a pulse of energy which propagates along said one beam such that two-photon absorption takes place at the successive locations of overlap of the pulse and said one beam.

17. The apparatus of claim 16 wherein said measuring means includes means for measuring the intensity of said one beam as a function of the locations of overlap between said pulse and said one beam, thereby to establish two-photon absorption at said selected locations.

18. The apparatus of claim 17 and further including means for generating a reference beam, the intensity of which correlating, location by location, to the attenuations over the path of said other beams due to attenuation modes other than two-photon absorption, and means for normalizing said one beam with respect to said reference beam on a location by location basis.

19. Apparatus for making remote atomic absorption measurement comprising:

means, including two collimated counter-propagating beams of coherent energy, for establishing two-photon absorption in the earth's atmosphere at selected locations, means for producing stimulated emission at the locations of two-photon absorption, and, means for measuring said stimulated emission at said selected locations.

20. The apparatus of claim 19 wherein said means for producing said stimulated emission includes means for generating a beam of coherent energy colinear with said counter-propagating beams.

21. The apparatus of claim 20 wherein said colinear beam is at a frequency corresponding to a predetermined transition of an element in the earth's atmosphere different from that at which said two-photon absorption takes place.

22. Apparatus for measuring atomic absorption associated with atoms or molecules of a gas comprising:

means, including two collimated counter-propagating beams of coherent energy, for establishing two-photon absorption in said gas, and, means for measuring a two-photon absorption related characteristic of one of said beams after said one beam has participated in establishing two-photon absorption.

23. The apparatus of claim 22 wherein said one beam is linearly polarized and wherein said measuring means includes crossed polarizer detection means.

24. The apparatus of claim 22 wherein said means for establishing said counter-propagating beams includes means for linearly polarizing said one beam prior to the two-photon interaction, and wherein said measuring means includes detector means illuminated by said one beam after it has participated in establishing the two-photon absorption, and linear polarizing means crossed with respect to said first mentioned linear polarizing means, said crossed linear polarizing means being positioned such that said one beam passes through it after said one beam has participated in establishing the two-photon absorption prior to detection.

25. The apparatus of claim 22 wherein said measuring means includes means for normalizing the measurement made thereby to a circularly polarized component of said one beam which does not contribute to the two-photon absorption.

26. The apparatus of claim 25 wherein said normalizing means includes crossed polarizing means.

27. The apparatus of claim 25 wherein said normalizing means includes means for resolving RHCP and LHCP components of said one beam and subtracting one from the other.

28. Apparatus for measuring atomic absorption associated with atoms or molecules of a gas comprising:

means, including two collimated counter-propagating beams of coherent energy, one of said beams being linearly polarized, for establishing absorption in said gas, and, means including crossed polarizer detection means for measuring an absorption related characteristic of said linearly polarized beam after said linearly polarized beam has participated in establishing said absorption.

29. Apparatus for measuring atomic absorption associated with atoms or molecules of an unconfined gas in the earth's atmosphere comprising:

means, including two counter-propagating beams of coherent energy for establishing absorption in said unconfined gas, and, means for measuring an absorption related characteristic of one of said beams after said one beam has participated in establishing said absorption.

30. The apparatus of claim 29 wherein said one beam is linearly polarized and wherein said measuring means includes crossed polarizer detection means.

* * * * *